(12) United States Patent
Kapralova et al.

(10) Patent No.: US 11,682,381 B2
(45) Date of Patent: Jun. 20, 2023

(54) ACOUSTIC MODEL TRAINING USING CORRECTED TERMS

(71) Applicant: Google LLC, Mountain View, CA (US)

(72) Inventors: Olga Kapralova, Bern (CH); Evgeny A. Cherepanov, Adliswil (CH); Dmitry Osmakov, Zurich (CH); Martin Baeuml, Hedingen (CH); Gleb Skobeltsyn, Kilchberg (CH)

(73) Assignee: Google LLC, Mountain View, CA (US)

( * ) Notice: Subject to any disclaimer, the term of this patent is extended or adjusted under 35 U.S.C. 154(b) by 6 days.

(21) Appl. No.: 17/457,421

(22) Filed: Dec. 2, 2021

(65) Prior Publication Data

US 2022/0093080 A1 Mar. 24, 2022

Related U.S. Application Data

(63) Continuation of application No. 16/837,393, filed on Apr. 1, 2020, now Pat. No. 11,200,887, which is a
(Continued)

(51) Int. Cl.
*G10L 15/06* (2013.01)
*G10L 15/22* (2006.01)
(Continued)

(52) U.S. Cl.
CPC ........... *G10L 15/063* (2013.01); *G10L 15/01* (2013.01); *G10L 15/06* (2013.01); *G10L 15/10* (2013.01);
(Continued)

(58) Field of Classification Search
CPC ....... G10L 15/063; G10L 15/01; G10L 15/06; G10L 15/10; G10L 15/22; G10L 15/32;
(Continued)

(56) References Cited

U.S. PATENT DOCUMENTS 6,735,565 B2 5/2004 Gschwendtner
6,912,498 B2 6/2005 Stevens et al.
(Continued)

FOREIGN PATENT DOCUMENTS

WO WO 2014/004612 * 1/2014

OTHER PUBLICATIONS

Ringger et al., "Error Correction Via a Post-Processor for Continuous Speech Recognition", 1996 IEEE International Conference on Acoustics, Speech, and Signal Processing Conference Proceedings (Year: 1996).*
(Continued)

*Primary Examiner* — Qian Yang
(74) *Attorney, Agent, or Firm* — Honigman LLP; Brett A. Krueger; Grant Griffith

(57) ABSTRACT

Methods, systems, and apparatus, including computer programs encoded on computer storage media, for speech recognition. One of the methods includes receiving first audio data corresponding to an utterance; obtaining a first transcription of the first audio data; receiving data indicating (i) a selection of one or more terms of the first transcription and (ii) one or more of replacement terms; determining that one or more of the replacement terms are classified as a correction of one or more of the selected terms; in response to determining that the one or more of the replacement terms are classified as a correction of the one or more of the selected terms, obtaining a first portion of the first audio data that corresponds to one or more terms of the first transcription; and using the first portion of the first audio data that is associated with the one or more terms of the first transcription to train an acoustic model for recognizing the one or more of the replacement terms.

20 Claims, 5 Drawing Sheets

Related U.S. Application Data continuation of application No. 16/023,658, filed on Jun. 29, 2018, now Pat. No. 10,643,603, which is a continuation of application No. 15/224,104, filed on Jul. 29, 2016, now Pat. No. 10,019,986.

(51) Int. Cl.
- *G10L 15/32* (2013.01)
- *G10L 15/01* (2013.01)
- *G10L 15/10* (2006.01)

(52) U.S. Cl.
CPC .............. *G10L 15/22* (2013.01); *G10L 15/32* (2013.01); *G10L 2015/0635* (2013.01); *G10L 2015/0638* (2013.01)

(58) Field of Classification Search
CPC ..... G10L 2015/0635; G10L 2015/0638; G10L 2015/221
See application file for complete search history.

(56) References Cited

U.S. PATENT DOCUMENTS

| | | | |
|---|---|---|---|
| 7,356,467 | B2 | 4/2008 | Kemp |
| 8,185,392 | B1 | 5/2012 | Strope et al. |
| 8,494,853 | B1 | 7/2013 | Mengibar et al. |
| 8,521,526 | B1 * | 8/2013 | Lloyd ................. G06F 16/3344 704/251 |
| 8,719,014 | B2 | 5/2014 | Wagner |
| 9,263,033 | B2 | 2/2016 | Siohan et al. |
| 9,378,731 | B2 | 6/2016 | Kapralova et al. |
| 2002/0123893 | A1 | 9/2002 | Woodward |
| 2005/0203751 | A1 * | 9/2005 | Stevens ................... G10L 15/22 704/E15.04 |
| 2006/0015338 | A1 | 1/2006 | Poussin |
| 2006/0074656 | A1 | 4/2006 | Mathias et al. |
| 2008/0104055 | A1 | 5/2008 | Segel |
| 2009/0138266 | A1 | 5/2009 | Nagae |
| 2010/0023331 | A1 | 1/2010 | Duta et al. |
| 2014/0019127 | A1 | 1/2014 | Park et al. |
| 2014/0056475 | A1 | 2/2014 | Jang et al. |
| 2014/0337032 | A1 * | 11/2014 | Aleksic ................... G10L 15/32 704/257 |
| 2015/0243278 | A1 | 8/2015 | Kibre et al. |
| 2016/0155436 | A1 | 6/2016 | Choi et al. |
| 2017/0004120 | A1 | 1/2017 | Eck et al. |

OTHER PUBLICATIONS

Witt et al., "Phone-level pronunciation scoring and assessment for interactive language learning", Speech Communication 30 (2000) 95-108 (Year: 2000).*

Jeong et al., "Using Higher-level Linguistic Knowledge for Speech Recognition Error Correction in a Spoken Q/A Dialog", Proceedings of the HLT-NAACL 2004 (Year: 2004).*

PCT International Preliminary Report on Patentability in International Appln. PCT/US2017/038336, dated Feb. 7, 2019, 10 pages.

Invitation to Pay Additional Fees and Where Applicable Protest Fee, with Partial Search Report, issued in International Application No. PCT/US2017/038336, dated Oct. 2, 2017, 11 pages.

International Search Report and Written Opinion, issued in International Application No. PCT/US2017/038336, dated Nov. 23, 2017, 17 pages.

Korean Intellectual Property Office—Notice of Office Action for Application No. 10-2019-7005232, dated Feb. 21, 2019.

* cited by examiner

ACOUSTIC MODEL TRAINING USING CORRECTED TERMS

CROSS-REFERENCE TO RELATED APPLICATION

This application is a continuation of, and claims priority under 35 U.S.C. § 120 from, U.S. patent application Ser. No. 16/873,393, filed on Apr. 1, 2020, which is a continuation of U.S. patent application Ser. No. 16/023,658, filed on Jun. 29, 2018, which is a continuation of U.S. patent application Ser. No. 15/224,104, filed on Jul. 29, 2016. The disclosures of the prior applications are considered part the disclosure of this application and are hereby incorporated by reference in their entireties.

TECHNICAL FIELD

This specification relates to speech recognition.

BACKGROUND

Devices can include software for responding to an utterance of a user of the device. Some utterances can include instructions to the device to call a phone number, text a phone number, operate an application, or search for information on the mobile device or the Internet. The device can employ speech-to-text, or automated speech recognition (ASR), processes to recognize a voice input from the user.

SUMMARY

According to one example implementation, a speech recognition system receives an utterance of one or more terms from a user. In response, the speech recognition system provides a transcription of the utterance to a user device. When the provided transcription is not correct, the speech recognition system can receive user input to correct a particular term or terms of the transcription. The speech recognition system trains an acoustic model using the user input to correct the particular term or terms and audio data corresponding to the particular term or terms.

In general, one innovative aspect of the subject matter described in this specification can be embodied in methods that include the actions of receiving first audio data corresponding to an utterance; obtaining a first transcription of the first audio data; receiving data indicating (i) a selection of one or more terms of the first transcription and (ii) one or more of replacement terms; determining that one or more of the replacement terms are classified as a correction of one or more of the selected terms; in response to determining that the one or more of the replacement terms are classified as a correction of the one or more of the selected terms, obtaining a first portion of the first audio data that corresponds to one or more terms of the first transcription; and using the first portion of the first audio data that is associated with the one or more terms of the first transcription to train an acoustic model for recognizing the one or more of the replacement terms. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method further includes receiving second audio data corresponding to an utterance, the second audio data including a second portion corresponding to the first portion of the first audio data; obtaining a second transcription of the second audio data; identifying the second portion from the second audio data; obtaining a corrected transcription of the second portion using the trained acoustic model; and obtaining a transcription that merges the second transcription and the corrected transcription. The method further includes obtaining search results responsive to the transcription that merges the second transcription and the corrected transcription; and providing one or more of the search results. Determining that the one or more of the replacement terms are classified as a correction of the one or more of the selected terms includes determining phonetic similarity between the one or more of the selected terms and the one or more of the replacement terms. Determining the phonetic similarity includes calculating a phonetic distance between each of the one or more of the selected terms and each of the one or more of the replacement terms. Determining that the one or more of the replacement terms are classified as a correction of the one or more of the selected terms includes determining connections among the one or more of the selected terms. Determining that the one or more of the replacement terms are classified as a correction of the one or more of the selected terms includes determining that the one or more of the selected terms are consecutive. Determining that the one or more of the replacement terms are classified as a correction of the one or more of the selected terms includes determining that each of the one or more of the selected terms includes a threshold number of characters.

The subject matter described in this specification can be implemented in particular embodiments so as to realize one or more of the following advantages. An acoustic model is trained to recognize a specific term from various pronunciations of the specific term. A speech recognition system using the trained acoustic model can provide a correct transcription of the specific term from the various pronunciations of the specific term without receiving a user's correction input.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1A:
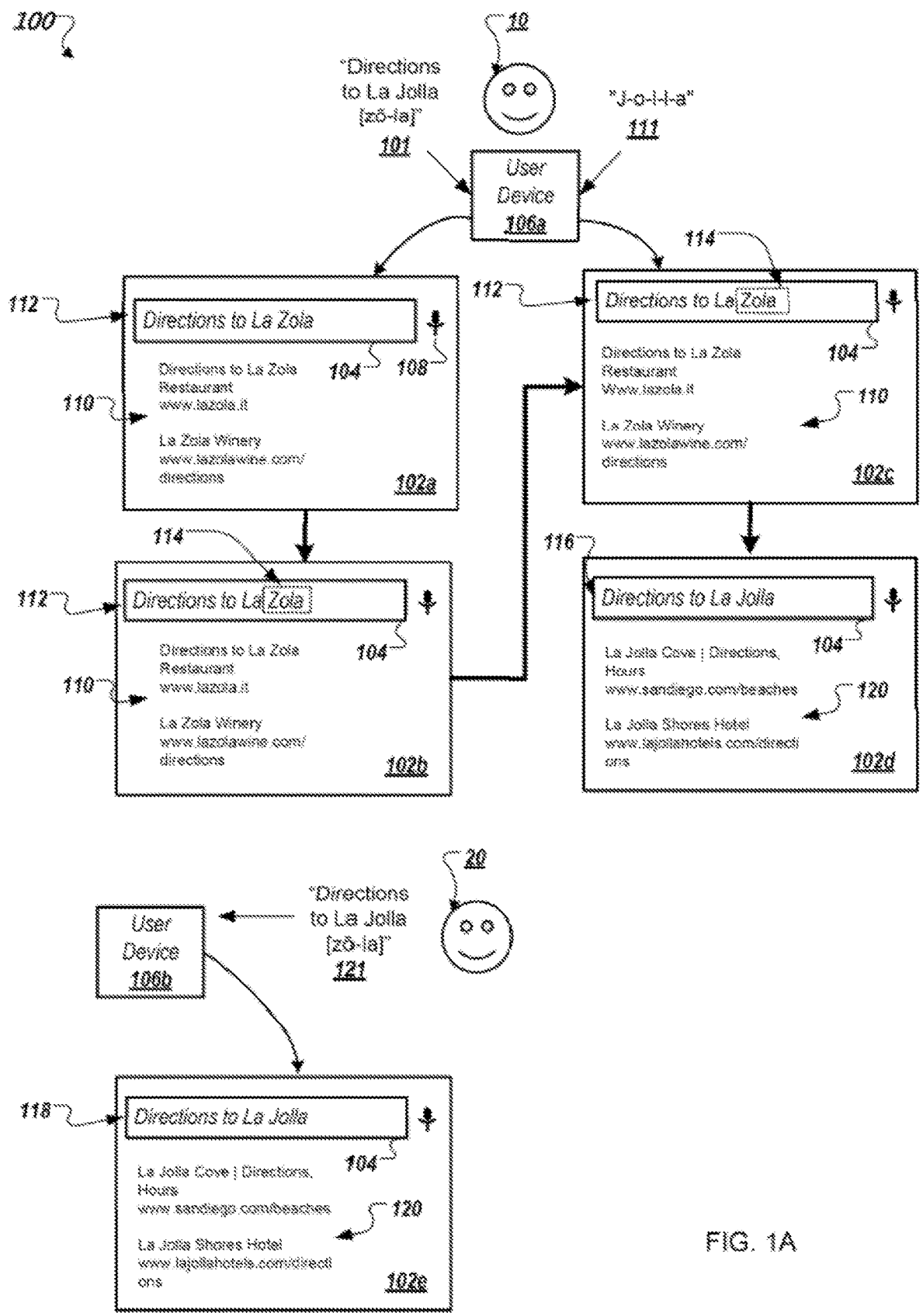
FIG. 1A is a diagram illustrating an example method for performing a voice search.

FIG. 1A illustrates an example method for performing a voice search, including receiving a correction input in an example user interface. A search system provides user interface 102a for displaying on a user device 106a, e.g., a mobile phone, tablet, or other user device configured to receive voice input. The user interface 102a includes a search box 104 for receiving typed input corresponding to a query and a microphone icon 108 for initiating a speech recognition session to receive a first voice query from a user 10 instead of a typed input. The user 10 inputs a first voice input 101, e.g., by selecting the microphone icon 108 in the user interface 102a. In some implementations, the user interface includes a keyboard layout that can be presented for typed input to the search box.

In a user session, the search system receives an utterance 101 from a user 10. For example, the utterance 101 can be a voice input. In particular, the user 10 provides a voice input of "Directions to La Jolla" to the user device 106a. For example, the user 10 can pronounce "Jolla" as [zō-la]. In response to the first voice input 101, user interface 102a is presented including a display of a first transcription 112 generated from the first voice input 101 in the search box 104. The first transcription 112 is "Directions to La Zola." For example, a speech-to-text process can be performed on the first voice query to generate a purported transcription as the corresponding first transcription 112. The search system can provide the transcription as the first transcription 112 to the user device 106a for display in the user interface 102a.

Furthermore, the first transcription 112 can be used as a query to a search system. The search system provides search results 110 responsive to the query "Directions to La Zola" for display in user interface 102b. For example, the search results 110 can include links to particular resources determined by the search system to be responsive to the query. However, in this example, the recognized query was recognized the term "Zola" instead of the term "Jolla."

As shown in user interface 102b, in response to the recognition, the user 10 can interact with the user interface 102b to select a portion 114 of the first transcription 112 corresponding to the recognized term "Zola." For example, in a touch interface, the user 10 can touch the recognized term 114 with a finger or stylus. In a non-touch interface, the user can navigate a cursor to the recognized term and select the recognized term, e.g., with a mouse input.

With reference to user interface 102c, the user 10 provides a first input 111 to the user device 106a. The first input 111 is provided to replace the selected portion 114 of the first transcription 112. For example, the first input 111 can be a typed input. The user 10 can type a spelling, letter by letter, of the term "j-o-l-l-a" to replace the selected portion 114. The user 10 may use a keyboard layout provided by the user interface to type the spelling of term.

As shown in user interface 102d, a corrected transcription "Directions to La Jolla" is displayed in the search box 104. Furthermore, in response to the corrected transcription 116, the search system provides search results 120 responsive to the corrected query "Directions to La Jolla" for presentation in the user interface 102d. For example, the search results 120 can include links to particular resources determined by the search system to be responsive to the corrected query. In some implementations, the search system recognizes the query as a particular type of request, e.g., directions, and provides a map interface as part of or instead of the search results 120.

Figure 1B:
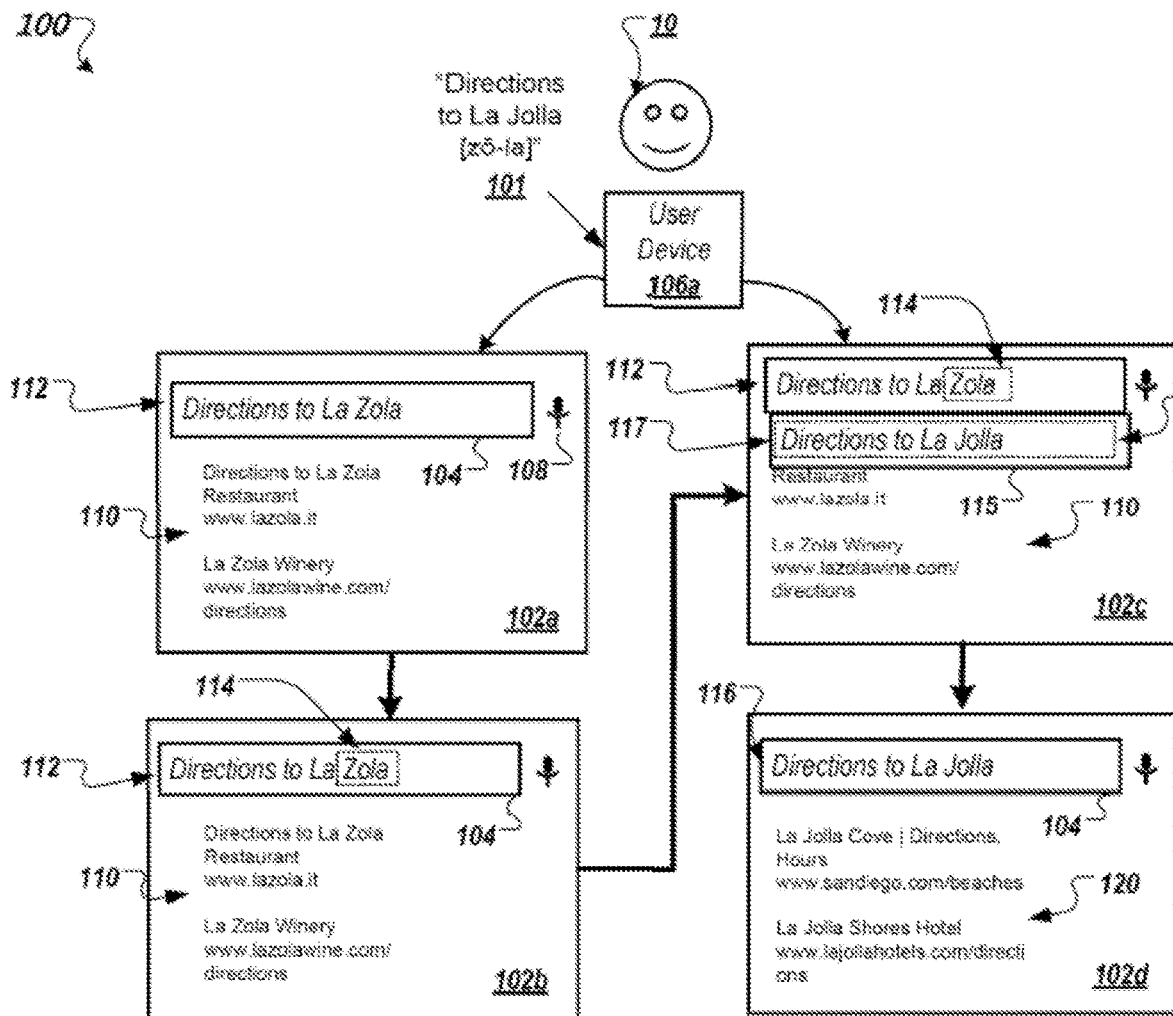
FIG. 1B is a diagram illustrating another example method for performing a voice search.
Figure 1B:
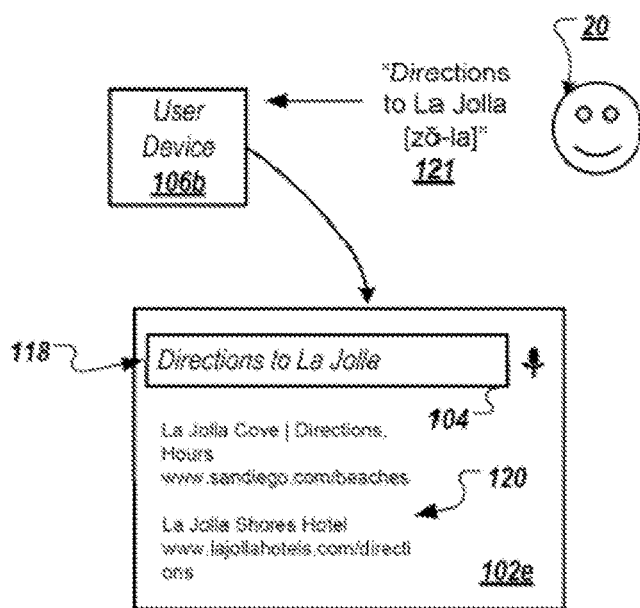

FIG. 1B illustrates another example method for performing a voice search. In this example, the user 10 can provide correction input to the user device 106a without typing a spelling of a term to replace the selected portion 114. With reference to user interface 102b, the user 10 selects a portion 114 of the first transcription 112 to replace the term "Zola." When the user 10 selects the portion 114 of the first transcription 112, one or more suggested transcriptions are provided to the user device 106a. For example, as shown in user interface 102c, a suggested transcription 117 of "Directions to La Jolla" can be displayed in a dropdown box 115. The user 10 can select the suggested transcription 117 to replace the first transcription 112. For example, in a touch interface, the user 10 can touch a portion 119 of the user interface 102c with a finger or stylus. In a non-touch interface, the user 10 can navigate a cursor to the portion 119 to select the suggested transcription 117 and select the portion 119, e.g., with a mouse input.

When the user 10 selects the suggested transcription 117, as shown in user interface 102d, a corrected transcription "Directions to La Jolla" is displayed in the search box 104. Furthermore, in response to the corrected transcription 116, the search system provides search results 120 responsive to the corrected query "Directions to La Jolla" for presentation in the user interface 102d. For example, the search results 120 can include links to particular resources determined by the search system to be responsive to the corrected query. In some implementations, the search system recognizes the query as a particular type of request, e.g., directions, and provides a map interface as part of or instead of the search results 120.

From the user sessions described with reference to FIGS. 1A and 1B, the system receives training data to train an acoustic model. In particular, the system receives (i) audio data corresponding to at least a portion of the first voice input 101 and (ii) one or more terms in the corrected transcription 116 as training data. In some implementations, the system receives audio data corresponding to "Directions to La Jolla [zō-la]" and a replaced term "Jolla" in the corrected transcription 116 as training data. The system identifies a portion of the audio data that corresponds to the selected term "Zola." The system isolates a portion of the audio data that corresponds to "Zola [zō-la]" from the audio data. Using the isolated portion of the audio data and the replaced term "Jolla," the system trains the acoustic model. For example, the system can train the acoustic model to recognize the term "Jolla" in response to a voice input of "Zola [zō-la]."

In some implementations, the system receives audio data corresponding to the first voice input and the entire corrected transcription as training data. For example, the system receives audio data corresponding to "Directions to La Jolla [zō-la]" and the entire corrected transcription "Direction to La Jolla." Using the audio data and the entire transcript, the system trains the acoustic model.

The user interface 102e is presented including a display of a second transcription 118 obtained using the trained acoustic model. In this user session, the system receives the second voice input 121 from a user 20. In particular, the user 20 provides a voice input of "Directions to La Jolla [zō-la]" to the user device 106b. In response to the second voice input 121, the system provides a second transcription 118 as "Directions to La Jolla" instead of "Directions to La Zola" using the trained acoustic model.

Moreover, in response to the second transcription 118, the search system provides search results 120 responsive to the corrected query "Directions to La Jolla" for presentation in the user interface 102e. For example, the search results 120 can include links to particular resources determined by the search system to be responsive to the corrected query. In some implementations, the search system recognizes the query as a particular type of request, e.g., directions, and provides a map interface as part of or instead of the search results 120.

Figure 2:
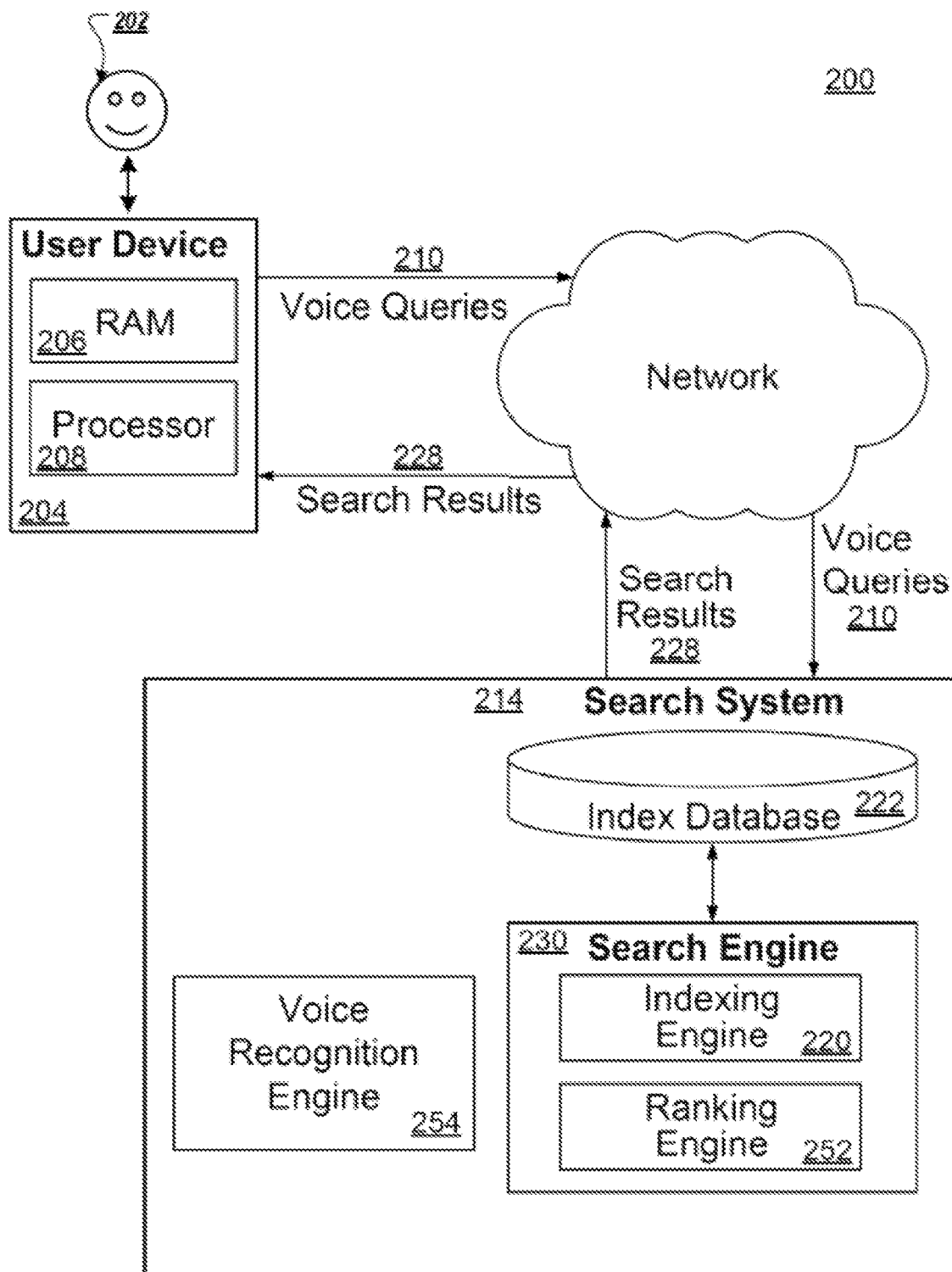
FIG. 2 is a diagram illustrating an example voice search system.

FIG. 2 illustrates an example voice search system 200 using a trained acoustic model. The system 200 provides search results relevant to submitted queries as can be implemented in an internet, an intranet, or another client and server environment. The system 200 is an example of an information retrieval system in which the systems, components, and techniques described below can be implemented.

A user 202 can interact with a search system 214 through a client device 204. For example, the client 204 can be a computer coupled to the search system 214 through a local area network (LAN) or wide area network (WAN), e.g., the Internet. In some implementations, the search system 214 and the client device 204 can be one machine. For example, a user can install a desktop search application on the client device 204. The client device 204 will generally include a random access memory (RAM) 206 and a processor 208.

The user 202 can submit voice queries 210 to a search engine 230 within a search system 214. When the user 202 submits a voice query 210, the voice query 210 is transmitted through a network to the search system 214. The search system 214 can be implemented as, for example, computer programs running on one or more computers in one or more locations that are coupled to each other through a network.

The search system 214 includes a speech recognition engine 254. The speech recognition engine 254 receives the voice query 210 and transcribes the voice query to a recognized query, e.g., using acoustic and language models. In some implementations, the recognized query is returned to the client device 204 for presentation to the user 202. Additionally, the recognized query is provided to the search engine 230.

The search system 214 further includes an index database 222 and a search engine 230. The search system 214 responds to an input query by generating search results 228, which are transmitted through the network to the client device 204 in a form that can be presented to the user 202 (e.g., as a search results web page to be displayed in a web browser running on the client device 204).

When the recognized query determined from the voice query 210 is received by the search engine 230, the search engine 230 identifies resources that match, or are responsive to, the query 210. The search engine 230 will generally include an indexing engine 220 that indexes resources (e.g., web pages, images, or news articles on the Internet) found in a corpus (e.g., a collection or repository of content), an index database 222 that stores the index information, and a ranking engine 252 (or other software) to rank the resources that match the query 210. The indexing and ranking of the resources can be performed using conventional techniques. The search engine 130 can transmit the search results 228 through the network to the client device 204 for presentation to the user 202.

In addition, the voice recognition engine 254 corrects one or more terms of the recognized query using an acoustic model. The acoustic model can be trained using techniques described above with reference to FIGS. 1A and 1B. In particular, the voice recognition engine 254 identifies a certain portion of the voice query 210 and determines one or more corrected terms corresponding to the portion of the voice query 210 using the acoustic model. The voice recognition engine 254 replaces the one or more terms of the recognized query, which corresponds to the portion of the voice query 210, to the one or more corrected terms. The voice recognition engine 254 obtains a corrected query and present the corrected query to the user device 204. The search engine 230 can identify resources that are responsive to the corrected transcription and provide one or more search results.

Figure 3:
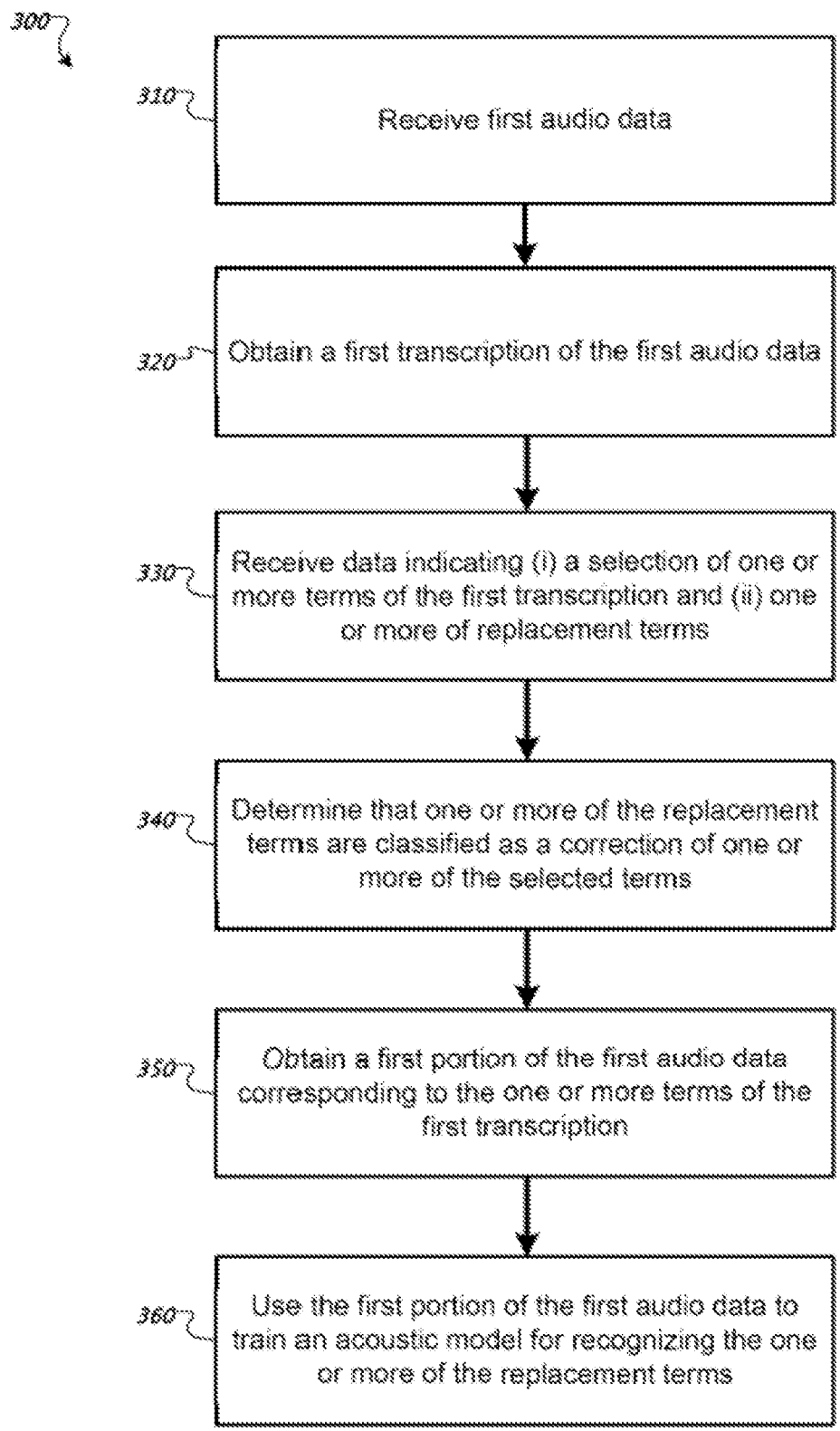
FIG. 3 is a flowchart illustrating an example method for training an acoustic model.

FIG. 3 illustrates an example method 300 for training an acoustic model. For convenience, the method 300 will be described as being performed by a system of one or more computers, located in one or more locations, and programmed appropriately in accordance with this specification.

The system receives first audio data corresponding to an utterance (310). For example, the utterance can be voice input. The user can select a voice input indicator, e.g., a microphone indicator, associated with particular user interface indicating a voice input can be provided. For example, user interface of the user device can include a microphone indicator. When a voice input is initiated by the user, a microphone of the user device captures voice input from the user. The voice input is then transmitted by the user device to the system. The voice input can be, for example, "Directions to La Jolla [zō-la]."

The system obtains a first transcription of the first audio data (320). The first transcription is a transcription of the received first audio data. For example, a language model can be used to provide transcription of the first audio data and convert it into a recognized text output. The speech to text technique can include the use of an acoustic model that identifies phonemes or other linguistic units from the audio signal and a language model that assigns probabilities to particular words or sequences of words. In some implementations, the speech to text technique can correct or compensate for errors in the voice input, e.g., based on spelling and/or grammar rules.

The first transcription is provided to the user device, for example, for display in particular user interface. The first transcription can be displayed, for example, to indicate the system's recognition of the first audio data. The user can then examine the presented first transcription to determine whether the system correctly recognized the first audio data. For example, the first audio data can be the voice query "Directions to La Jolla [zō-la]" which may be recognized in the first transcription as the query "Directions to La Zola." Here, the word "Jolla" was recognized as "Zola."

Additionally, the system can perform an action responsive to the first transcription. For example, the system can obtain search results using the first transcription as a search query. One or more search results responsive to the search query can be provided to the user device for display in the search interface. In some implementations, the action is part of a particular task, e.g., creating a calendar entry. In some other implementations, the first transcription corresponds to the action, e.g., inputting text in a text editor or e-mail.

The system receives data indicating (i) a selection of one or more terms of the first transcription and (ii) one or more replacement terms (330). The selection of the one or more terms of the first transcription can be received by direct input, e.g., using a finger on a touch screen, or using a particular input device e.g., a mouse cursor or stylus. For example, the user can touch a particular term or terms of the first transcription. In response, the selected term or terms can be highlighted by the user device indicating the selected term or terms. Thus, for the first transcription "Directions to La Zola," the user can select the term "Zola."

In some implementations, the one or more replacement terms can be received by typed input. The user interface includes a keyboard layout that can be presented for receiving the typed input from the user. In particular, the user can type a particular term or terms to replace the selected term or terms using the keyboard layout. For example, after selecting the term "Zola," the user can type the individual letters "j-o-l-l-a." The typed input is not limited to a single term. For example, the terms "La Zola" are selected, the user can type letters "l-a-j-o-l-l-a."

In some implementations, the one or more replacement terms can be received by a user selection of a suggested transcription presented in user interface. For example, the user interface can include a dropdown box that is provided when a particular term or terms of the first transcription is selected. The system presents one or more suggested transcriptions in the dropdown box. Each of the one or more suggested transcriptions includes a replacement term or terms to replace the particular term or terms. For example, when the term "Zola" of the first transcription is selected, the system provides a dropdown box where one or more suggested transcriptions are presented. One of the suggested transcriptions can be "Directions to La Jolla." Here, the term "Jolla" is a replacement term to replace the selected term "Zola." The user can select the suggested transcription "Directions to La Jolla" in the dropdown box and the system receives term "Zola" as a replacement term.

The system determines whether one or more replacement terms are classified as a correction of one or more selected terms (340). The determination can be made based on certain criteria. In some implementations, the determination can be based on a phonetic similarity between each selected term and each replacement term. In particular, the phonetic similarity measures how similar the sound of the selected term is to the replacement term. The phonetic similarity between the selected term and the replacement term can be determined using a distance measure. In some implementations, the phonetic distance can be based on a minimum edit distance between the selected term and the replacement term. The system can determine that the replacement term is a correction of the selected term if a minimum edit distance between the replacement term and the selected term is equal or more than a threshold value, e.g., 2. For example, the user may select the term "Zola" from the first transcription and replace the term "Zola" to the term ""Jolla." The system can determine that the minimum edit distance is 2 because "Z" is replaced with "J" and "l" is added. In response, the system can determine that the replacement term "Jolla" is a correction of the selected term "Zola." By determining whether a replacement term is likely a correction of a selected term before training an acoustic model to recognize the replacement term using audio data corresponding to the selected term, the method can prevent erroneous training of the acoustic model when the replacement term is not intended to correct the selected term, e.g., when a user creates an entirely new query by changing "La Zola" in the mistranscribed term "Directions to La Zola," to "Eiffel Tower," thereby creating an entirely new query "Directions to Eiffel Tower." In doing so, the method 300 can avoid introducing an inaccuracy into the acoustic model, and can thereby improve the accuracy of subsequent transcriptions.

For another example, where the system provides a first transcription as "Directions to La Jolla," the user may select "Directions" from the first transcription and replace the term "Directions" to the term "Direction." The system can determine that the minimum edit distance is 1 because "s" is deleted. In response, the system can determine that the replacement term "Direction" is not a correction of the selected term "Directions." Thus, the system can filter out replacements such as correcting article errors or typo not to be used for training the acoustic model. In some implementations, the minimum edit distance measures a number of different sounds between the selected term and the replacement term. In some implementations, the minimum edit distance is calculated using phonetic dictionaries. In some implementations, the minimum edit distance is calculated using an acoustic models, for example, acoustic Hidden-Markov-Models.

In some implementations, the determination can be based on connections among the selected terms. In particular, the connections measure how close one selected term is to other selected terms. The connections can be determined using a connection distance measure. In some implementations, the connection distance can be determined based on a number of words between one selected term and other selected terms. If the number of words is equal or more than a threshold value, e.g., 2, the system can determine that the replacement term is not a correction of the selected term. For example, the user may select two terms "Directions" and "Zola" from the first transcription and replace the term "Zola" to the term "Jolla." The system can determine that the connection distance between the two terms is 2 because there are two terms "to" and "La" between the selected terms "Directions" and "Zola." In response, the system can determine that the replacement term is not a correction of the selected term. Thus, the selected terms "Directions" and "Zola" are not used to train the acoustic model because the term "Directions" could have been selected by a user's mistake such a touch error.

For another example, the user may select two terms "La" and "Zola" from the first transcription and replace the term "Zola" to "Jolla." The connection distance between the two terms is 0 because there is no term between the two terms "La" and "Zola." The system can determine that the replacement term is a correction of the selected term.

In some implementations, the determination can be based on consecutiveness of the selected terms. For example, the user may select the term "Direction" and the term "Zola" from the first transcription. The system can determine that the selected terms are not consecutive. In response, the system can determine that the one or more replacement terms are not a correction of one or more selected terms. Thus, the selected terms may not be used to train the acoustic model because the term "Directions" could have been selected by a user's mistake such as a touch error.

For another example, the user may select the terms "La" and "Zola" from the first transcription and replace the term "Zola" to "Jolla." The system can determine that the selected terms "La" and "Zola" are consecutive. In response, the system can determine that the replacement term is a correction of the selected term.

In some implementations, the determination can be based on a number of characters in each of the one or more selected terms. For example, the user may select the term "to" from the first transcription and replace the term "to" to "from." The system can calculate the number of characters, i.e., two characters, in the selected term "to." In response, the system can determine that the replacement term is not a correction of the selected term. Thus, the system can filter out replacements such as correcting prepositions not to be used for training the acoustic model.

For another example, the user may select "Zola" from the first transcription. The system can determine the number of characters is 4 in the selected term "Zola." In response, the system can determine that the replacement term is a correction of the selected term.

In response to determining that the one or more of the replacement terms are classified as a correction of the one or more of the selected terms, the system obtains a first portion of the first audio data that corresponds to one or more terms of the first transcription (350). In some implementations, the first portion of the first audio data can be the entire first audio data. For example, the system can obtain the first portion that is the first audio data corresponding to the user's utterance "Directions to La Jolla [zō-la]."

In some implementations, the first portion of the first audio data can be isolated from the first audio data. The first portion corresponds to a particular term or terms in the first transcription that are selected by the user. For example, the user may select the term "Zola." The system isolates the first portion corresponding to the term "Zola" from the first audio data. In this example, the sound of the first portion can be [z ō-la].

In some implementations, the system can isolate the first portion from the first audio data using timings that each term of the first transcription starts and ends. For example, where the system obtains the first transcription of "Directions to La Zola," the system can determine the timings that each term of the first transcription starts and ends based on audio features such as a magnitude and a frequency of audio. In this example, the system can determine eight distinctive timings that the four terms of the first transcription start and end. Where the first portion of the first audio data corresponds to the term "Zola," the system can identify the timings that the term "Zola" starts and ends. Thus, the system can determine that a portion of the first audio data between the two timings is the first portion of the audio data.

The system uses the first portion of the first audio data that is associated with the one or more terms of the first transcription to train an acoustic model for recognizing the one or more of the replacement terms (360). In some implementations, the system uses the entire first audio data and the entire first transcription to train the acoustic model. In some implementations, the system uses the isolated first portion that is associated with the one or more terms of the first transcription to train the acoustic model. For example, after isolating the first portion [zō-la] from the first audio data, the system can use the first portion [zō-la] to train the acoustic model for recognizing the replacement term "Jolla."

Figure 4:
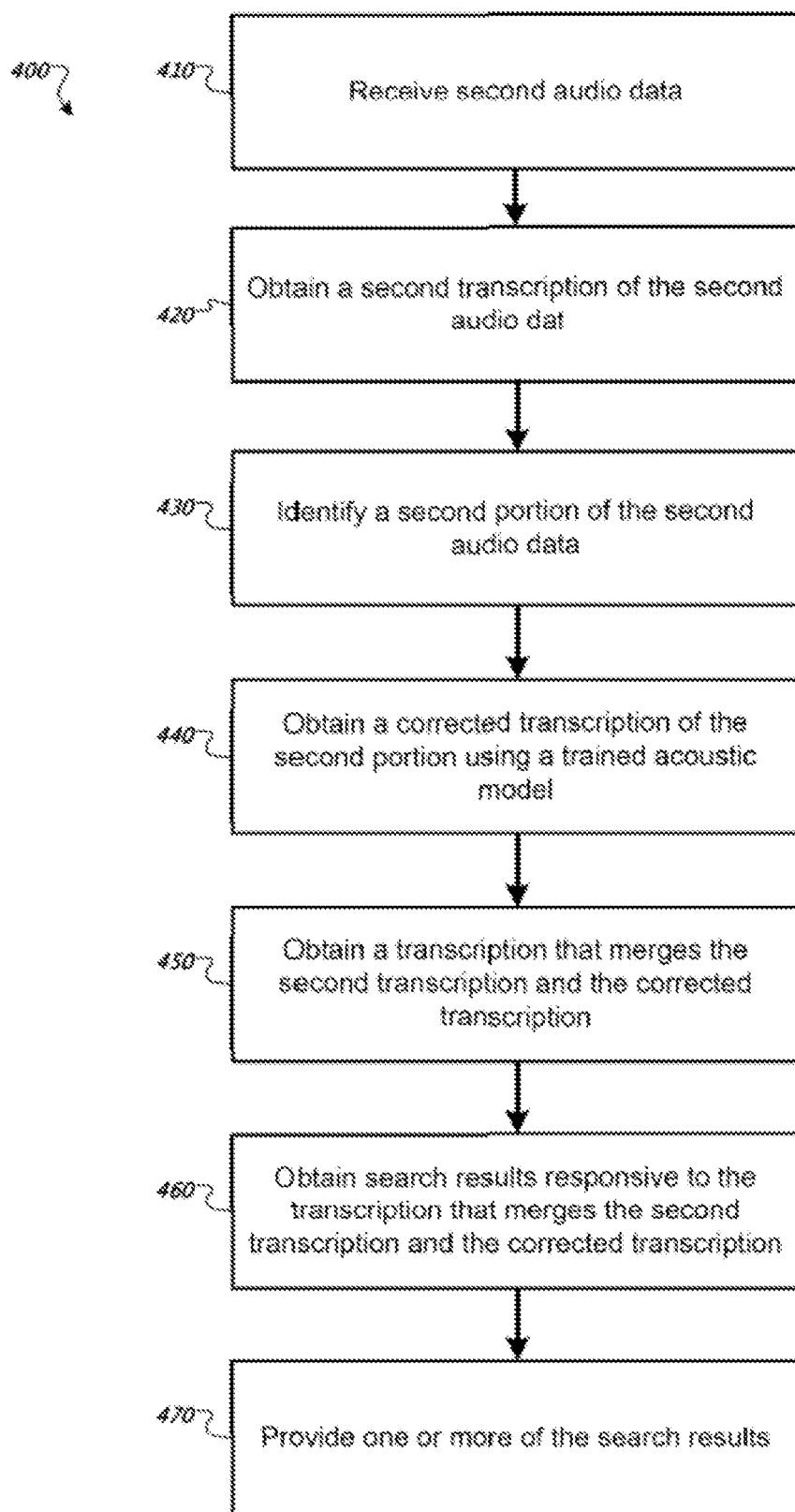
FIG. 4 is a flowchart illustrating an example method for providing search results using a trained acoustic model.

FIG. 4 illustrates an example method 400 for providing search results using a trained acoustic model. For convenience, the method 400 will be described as being performed by a system of one or more computers, located in one or more locations, and programmed appropriately in accordance with this specification.

The system receives second audio data corresponding to an utterance (410). For example, the utterance can be a voice input. The user can select a voice input indicator, e.g., a microphone indicator, associated with particular user interface indicating a voice input can be provided. For example, user interface of the user device can include a microphone indicator. When a voice input is initiated by the user, a microphone of the user device captures voice input from the user. The voice input is then transmitted by the user device to the system. The voice input can be, for example, "Directions to La Jolla [zō-la]."

The system obtains a second transcription of the second audio data (420). The second transcription is a transcription of the received second audio data. For example, acoustic and language models can be used to provide the second transcription of the second audio data and convert it into a recognized text output. For example, the second audio data can be the voice input "Directions to La Jolla [zō-la]" which may be recognized in the second transcription as "Directions to La Zola."

The system identifies a second portion of the second audio data (430). In particular, the second portion of the second audio data corresponds to the first portion of the first audio data described with reference with FIG. 3. For example, the system can identify the second portion [zō-la] of the second audio data that corresponds to the first portion [zō-la] of the first audio data.

The system obtains that a corrected transcription of the second portion using a trained acoustic model (440). In particular, the trained acoustic model can be an acoustic model that is trained using techniques described above. For example, referring to the example described with reference to FIG. 3, the acoustic model is trained to recognize the replacement term "Jolla" using the first portion [zō-la] of the first audio data. In response to the identified second portion [zō-la] that corresponds to the first portion [zō-la], the system can obtain the corrected transcription "Jolla" for the second portion of the second audio data.

The system obtains a transcription that merges the second transcription and the corrected transcription (450). The system replaces a particular term or terms of the second transcription corresponding to the second portion to the corrected transcription and obtains a new transcription that merges the second transcription with the corrected transcription. For example, the system replaces the term "Zola" of the second transcription to the corrected transcription "Jolla" and obtains the merged transcription "Directions to La Jolla."

The system obtains search results responsive to the transcription that merges the second transcription and the corrected transcription (460). For example, the system obtains search results responsive the transcription "Directions to La Jolla." The search results can include links to particular resources determined by the search system to be responsive to the corrected query. In some implementations, the search system recognizes the query as a particular type of request, e.g., directions, and provides a map interface as part of or instead of the search result.

The system provides one or more of the search results (470). The system provide the obtained search results to the user device. For example, the system can provide the search results to be displayed in the user interface of the user device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method when executed on data processing hardware causes the data processing hardware to perform operations comprising:
   receiving training data comprising a corrected transcription including a specific term that replaced another term in an initial transcription of an utterance;
   training, using the training data, a model to learn to recognize pronunciations of the specific term in voice inputs;
   receiving a voice query comprising a pronunciation of the specific term;
   transcribing, using a speech recognition engine, the voice query to a first recognized query comprising a plurality of recognized terms; and
   generating, using the trained model, based on a phonetic similarity between the specific term and one of the plurality of recognized terms, a corrected recognized query that replaces the one of the plurality of recognized terms with the specific term.

2. The computer-implemented method of claim 1, wherein the operations further comprise displaying, in a graphical user interface, the corrected recognized query.

3. The computer-implemented method of claim 1, wherein the operations further comprise providing the corrected recognized query to a search engine, the search engine configured to generate search results that are determined to be responsive to the corrected recognized query.

4. The computer-implemented method of claim 3, wherein the operations further comprise displaying, in a graphical user interface, the search results generated by the search engine that are determined to be responsive to the corrected recognized query.

5. The computer-implemented method of claim 4, wherein displaying the search results comprises displaying, in the graphical user interface, links to resources determined to be responsive to the corrected recognized query.

6. The computer-implemented method of claim 4, wherein search results displayed in the graphical user interface comprise the specific term.

7. The computer-implemented method of claim 1, wherein receiving the voice query comprises receiving the voice query from a user device associated with a user.

8. The computer-implemented method of claim 1, wherein the one of the plurality of recognized terms of the recognized query replaced by the specific term comprises a mis-transcribed term.

9. The computer-implemented method of claim 1, wherein the specific term and the one of the recognized terms replaced by the specific term in the corrected recognized query comprise nouns.

10. The computer-implemented method of claim 1, wherein the speech recognition engine comprises a language model.

11. A system comprising:
    data processing hardware; and
    memory hardware in communication with the data processing hardware and storing instructions that when executed by the data processing hardware cause the data processing hardware to perform operations comprising:
      receiving training data comprising a corrected transcription including a specific term that replaced another term in an initial transcription of an utterance;
      training, using the training data, a model to learn to recognize pronunciations of the specific term in voice inputs;
      receiving a voice query comprising a pronunciation of the specific term;
      transcribing, using a speech recognition engine, the voice query to a first recognized query comprising a plurality of recognized terms; and
      generating, using the trained model, based on a phonetic similarity between the specific term and one of the plurality of recognized terms, a corrected recognized query that replaces the one of the plurality of recognized terms with the specific term.

12. The system of claim 11, wherein the operations further comprise displaying, in a graphical user interface, the corrected recognized query.

13. The system of claim 11, wherein the operations further comprise providing the corrected recognized query to a search engine, the search engine configured to generate search results that are determined to be responsive to the corrected recognized query.

14. The system of claim 13, wherein the operations further comprise displaying, in a graphical user interface, the search results generated by the search engine that are determined to be responsive to the corrected recognized query.

15. The system of claim 14, wherein displaying the search results comprises displaying, in the graphical user interface, links to resources determined to be responsive to the corrected recognized query.

16. The system of claim 14, wherein search results displayed in the graphical user interface comprise the specific term.

17. The system of claim 11, wherein receiving the voice query comprises receiving the voice query from a user device associated with a user.

18. The system of claim 11, wherein the one of the plurality of recognized terms of the recognized query replaced by the specific term comprises a mis-transcribed term.

19. The system of claim 11, wherein the specific term and the one of the recognized terms replaced by the specific term in the corrected recognized query comprise nouns.

20. The system of claim 11, wherein the speech recognition engine comprises a language model.

\* \* \* \* \*